United States Patent
Kesler et al.

(10) Patent No.: US 9,556,993 B2
(45) Date of Patent: Jan. 31, 2017

(54) BLOCK FITTING FOR METAL SEAL STRUCTURES

(71) Applicant: HALLA VISTEON CLIMATE CONTROL CORP., Daejeon (KR)

(72) Inventors: Eric William Kesler, Northville, MI (US); Fred Georg Schroeder, Grosse Ile, MI (US); Kastriot Shaska, Northville, MI (US)

(73) Assignee: HANON SYSTEMS, Daejeon-si (KR)

( * ) Notice: Subject to any disclaimer, the term of this patent is extended or adjusted under 35 U.S.C. 154(b) by 265 days.

(21) Appl. No.: 14/180,781

(22) Filed: Feb. 14, 2014

(65) Prior Publication Data
US 2015/0233514 A1  Aug. 20, 2015

(51) Int. Cl.
*F16L 23/028* (2006.01)
*F16L 41/06* (2006.01)
*F16L 23/18* (2006.01)

(52) U.S. Cl.
CPC ............... *F16L 41/06* (2013.01); *F16L 23/18* (2013.01)

(58) Field of Classification Search
CPC .......... F16L 41/06; F16L 41/08; F16L 23/024; F16L 23/18; F16L 23/028
USPC ............................................. 285/124.3, 331
See application file for complete search history.

(56) References Cited

U.S. PATENT DOCUMENTS

| | | | | |
|---|---|---|---|---|
| 6,386,593 | B1 * | 5/2002 | Slais | B60H 1/00571 |
| | | | | 277/609 |
| 6,834,893 | B2 * | 12/2004 | Schroeder | F16L 21/08 |
| | | | | 285/124.5 |
| 7,621,568 | B2 | 11/2009 | Schroeder et al. | |
| 7,766,391 | B2 * | 8/2010 | Kim | F16L 23/18 |
| | | | | 285/205 |
| 8,104,773 | B2 | 1/2012 | Schroeder et al. | |
| 8,468,849 | B2 * | 6/2013 | Kesler | F16L 23/0283 |
| | | | | 251/148 |
| 8,523,244 | B2 | 9/2013 | Schroeder et al. | |

(Continued)

FOREIGN PATENT DOCUMENTS

EP        2284429 A1    2/2011
KR    1020080046160 A   5/2008

OTHER PUBLICATIONS http://visteon.com/media/newsroom/2010/100318_story1.html; May 15, 2014.
http://articles.sae.org/8247/May 15, 2014.

*Primary Examiner* — Adriana Figueroa
(74) *Attorney, Agent, or Firm* — Fraser Clemens Martin & Miller LLC; James D. Miller

(57) ABSTRACT

A block fitting for an air conditioning system includes a male block portion and a female block portion. The male block portion has a first annular pilot. The female block portion has a first annular collar that receives the first annular pilot of the male block portion. The first aperture of the male block portion and the first aperture of the female block portion are substantially concentrically aligned. A first seal structure is disposed between the first annular pilot of the male block portion and the first annular collar of the female block portion. A fastener engages the male block portion with the female block portion to form a substantially fluid tight seal. One of the of the male block portion and the female block portion has a stabilizing heel formed adjacent a side surface thereof. The stabilizing heel militates against transverse dynamic loading of the seal structure in operation.

19 Claims, 5 Drawing Sheets

(56) References Cited

U.S. PATENT DOCUMENTS

| | | | | |
|---|---|---|---|---|
| 9,261,194 B2* | 2/2016 | Kesler | ............... | F16J 15/061 |
| 2015/0115603 A1* | 4/2015 | Trombley | ........... | F16L 19/0218 |
| | | | | 285/368 |

* cited by examiner

BLOCK FITTING FOR METAL SEAL STRUCTURES

FIELD OF THE INVENTION

The invention relates to a fitting for a vehicle air conditioning system and, more particularly, to a fitting for coupling tubing segments.

BACKGROUND OF THE INVENTION

In assembly line manufacturing of vehicles, it is desirable that line fittings in air conditioning systems be secured using a power nut driver rather than using a fastening method requiring a backup wrench to counteract the torque. For this reason, peanut or block type fittings are often used.

Various refrigerants, some of which present environmental concerns, have been used in air conditioning systems for vehicles. As a result, legislation has been passed by various governmental agencies of the United States and the European Union, requiring that air conditioning systems operate with substantially no refrigerant leaks.

Seal structures with metal seal fittings suitable for installation using a power nut driver have been used to militate against leaks in the air conditioning system. Such seal structures and related block fittings are described, for example, in Assignee's U.S. Pat. No. 7,621,568 to Schroeder et al., U.S. Pat. No. 8,104,773 to Schroeder et al., U.S. Pat. No. 8,523,244 to Schroeder et al.

It has been found that, in applications where the metal seal fittings are subjected to severe vibration, for example, when used in an engine mounted discharge line, a prying action may occur. It is believed that the prying action results from transverse dynamic loads, which are applied to the seal fitting by engine roll and related vibrations in operation. Undesirably, the prying action can result in a loss of clamp load, and degradation of the resulting metal seal joint, over time.

There is a continuing need for a block fitting for metal seal structures which stabilizes the seal joint against transverse dynamic loads. Desirably, the block fitting militates against the loss of clamp load and seal joint degradation, and facilitates a use of the metal seal structures in applications where the metal seal structures may be subject to severe vibration.

SUMMARY OF THE INVENTION

In concordance with the instant disclosure, a block fitting for metal seal structures, which stabilizes the seal joint against transverse dynamic loads, militates against the loss of clamp load and seal joint degradation, and facilitates a use of the metal seal structures in applications where the metal seal structures may be subject to severe vibration, is surprisingly discovered.

In one embodiment, a block fitting for an air conditioning system includes a male block portion, a female block portion, a first seal structure, and a fastener. The male block portion has a first annular pilot surrounding a first aperture of the male block portion. The first annular pilot includes an axially extending lip formed at a first end thereof. The female block portion has a first annular collar surrounding a first aperture of the female block portion. The first annular collar receives the first annular pilot of the male block portion. The first aperture of the male block portion and the first aperture of the female block portion are substantially concentrically aligned. The first seal structure is disposed between the first annular pilot of the male block portion and the first annular collar of the female block portion. The fastener engages the male block portion with the female block portion to form a substantially fluid tight seal with the first seal structure. One of the male block portion and the female block portion has a stabilizing heel formed adjacent a side surface thereof. The stabilizing heel militates against transverse dynamic loading of the seal structure in operation.

In another embodiment, a block fitting for an air conditioning system includes a male block portion having a stabilizing heel formed adjacent a side surface thereof. The male block portion has a first annular pilot surrounding a first aperture of the male block portion. The first annular pilot has an axially extending lip formed at a first end thereof. The stabilizing heel is configured to abut a female block portion having a first annular collar surrounding a first aperture of the female block portion. A first seal structure is disposed radially inward from the axially extending lip of the male block portion. A fastener engages the male block portion with the female block portion and forms a substantially fluid tight seal with the first seal structure. The stabilizing heel militates against transverse dynamic loading of the first seal structure in operation.

In a further embodiment, a block fitting for an air conditioning system includes a female block portion having a stabilizing heel formed adjacent a side surface thereof. The female block portion has a first annular collar surrounding a first aperture of the female block portion. The stabilizing heel is configured to abut a male block portion having a first annular pilot surrounding a first aperture of the male block portion. The first annular pilot includes an axially extending lip formed at a first end thereof. A first seal structure is disposed radially inward from the first annular collar of the female block portion. A fastener engages the female block portion with the male block portion to form a substantially fluid tight seal with the first seal structure. The stabilizing heel militates against transverse dynamic loading of the first seal structure in operation.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
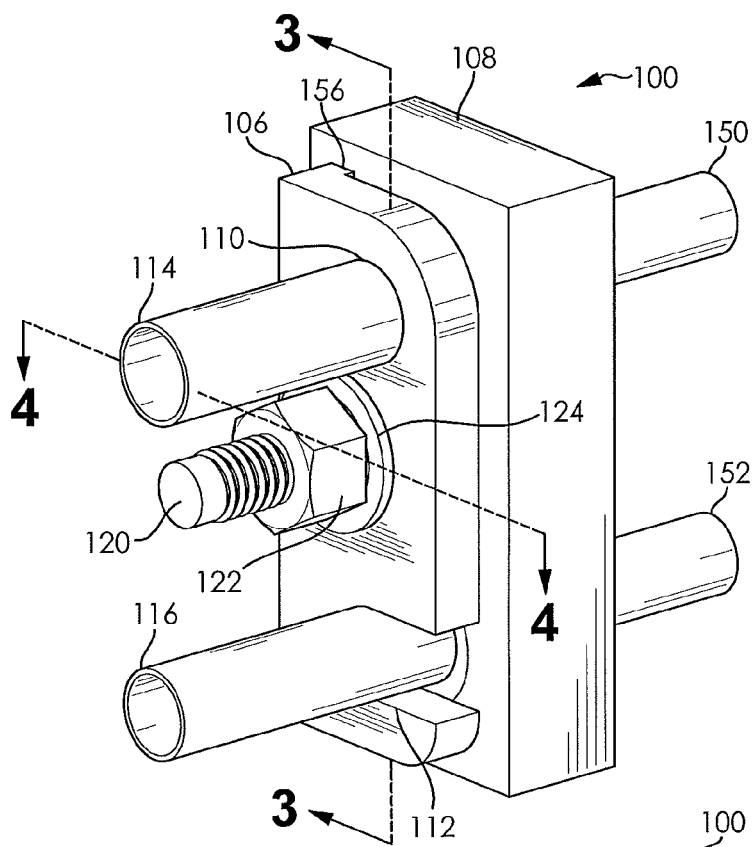
FIG. 1 is a perspective view of a block fitting for metal seal structures according to one embodiment of the present disclosure, showing a stabilizing heel formed on a male block portion of the block fitting.

The following detailed description and appended drawings describe and illustrate various exemplary embodiments of the invention. The description and drawings serve to enable one skilled in the art to make and use the invention, and are not intended to limit the scope of the invention in any manner.

FIGS. 1 to 10 show a block fitting 100 for an air conditioning system. The block fitting 100 may be particularly useful with metal seal structures 102, 104 as disclosed in, for example: Assignee's U.S. Pat. Nos. 7,621,568; 8,104,773; and 8,523,244, all to Schroeder et al., the entire disclosures of which are hereby incorporated herein by reference.

The metal seal structures 102, 104 may have a first sealing portion formed from tin coated copper and a second sealing portion formed from an elastomer, as nonlimiting examples. The metal seal structures 102, 104 may be the same size and configuration, or different sizes, or different configurations, as desired.

Although the block fitting 100 is described primarily herewith with respect to the metal seal structures 102, 104 having the first and second sealing portions, one of ordinary skill in the art should understand that the block fitting 100 of the present disclosure may also be used with other types of seal structures, within the scope of the present disclosure.

The block fitting 100 includes a male block portion 106 and a female block portion 108. The male block portion 106 includes a first aperture 110 and a second aperture 112. The first aperture 110 receives a first tube or conduit 114, and the second aperture receives a second tube or conduit 116. As shown in FIGS. 1-5 and 7, the first aperture 110 may have a generally circular cross-section, and the second aperture 112 may be a slot formed in a side surface of the block fitting 100. It should be appreciated that the first aperture 110 and the second aperture 112 may both have a generally circular cross-section, or be in the form of a slot, as desired.

The first conduit 114 and the second conduit 116 may be disposed through the first aperture 110 and the second aperture 112, respectively, and be supported by the male block portion 106. For example, there may be a press fit between at least one of the first conduit 114 and a wall defining the first aperture 110, and the second conduit 116 and a wall defining the second aperture 112. The first conduit 114 and the second conduit 116 can be further joined to the male block portion 106 by any conventional method such as by brazing or welding, as nonlimiting examples.

The male block portion 106 includes a third aperture 118 adapted to receive a fastener 120. For example, the fastener 120 may be in the form of a threaded stud or a bolt, which is secured to the block fitting 100 with a nut 122 and a washer 124. It should also be appreciated that other types of the fastener 120 may be employed within the scope of the present disclosure.

Each of the first aperture 110 and the second aperture 112 has an annular pilot 126, 128 formed adjacent thereto. The annular pilots 126, 128 cooperate with the female block portion 108, as described further herein. The annular pilots 126, 128 may be formed on the male block portion 106, or an end of one of the first conduit 114 and the second conduit 116 disposed through the male block portion 106, as desired.

Figure 2:
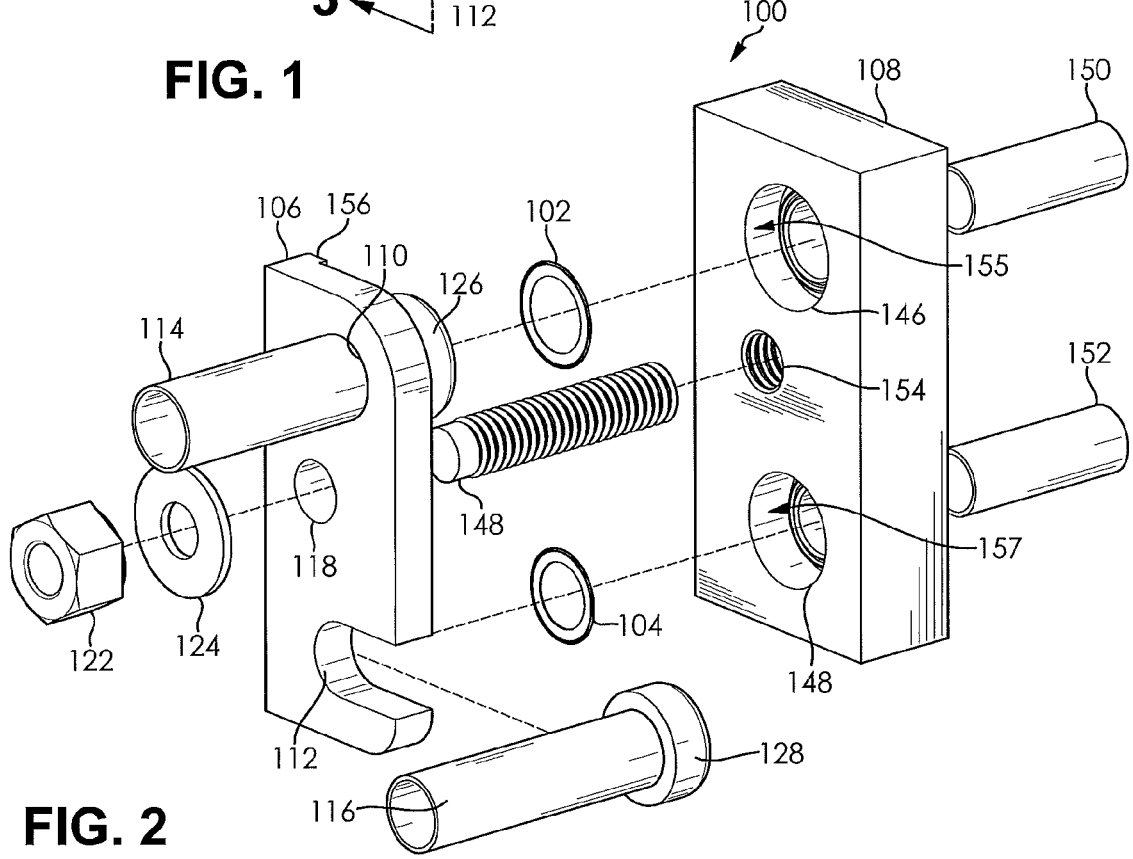
FIG. 2 is an exploded perspective view of the block fitting shown in FIG. 1.
Figure 3:
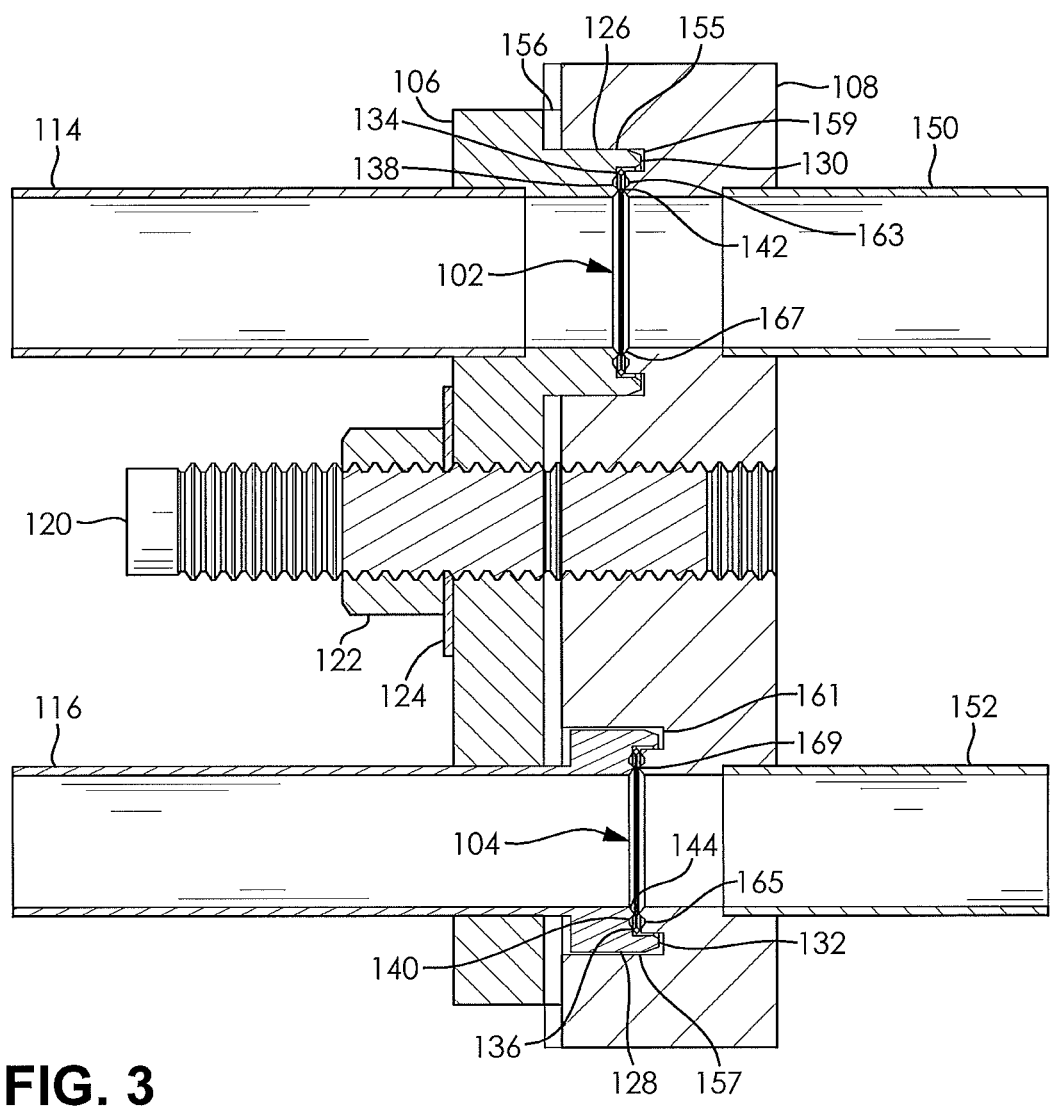
FIG. 3 is an cross-sectional side elevational view of the block fitting taken along section line 3-3 in FIG. 1.
Figure 4:
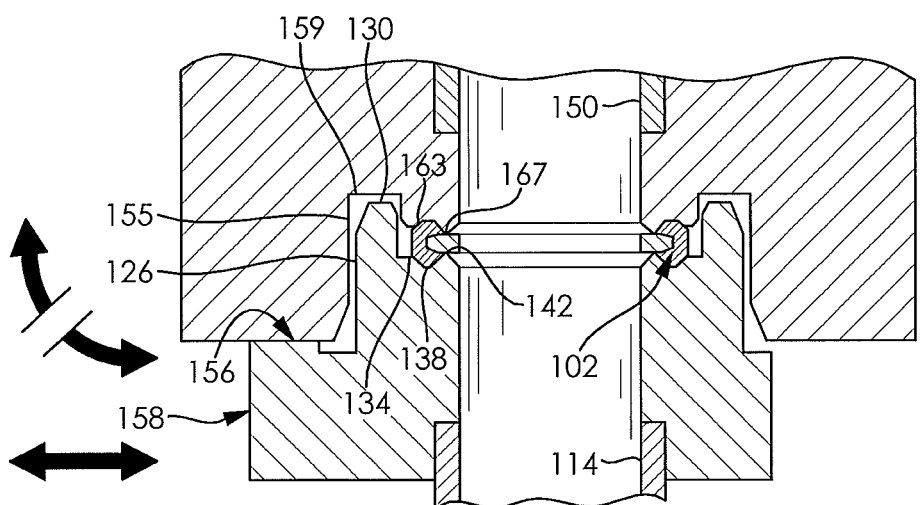
FIG. 4 is an enlarged fragmentary cross-sectional top plan view of the block fitting taken along section line 4-4 in FIG. 1.

In the particular embodiments illustrated in FIGS. 1 to 10, the annular pilot 126 disposed adjacent the first aperture 110 is formed on the male block portion 106 and circumscribes the first aperture 110. The annular pilot 128 disposed adjacent the second aperture 112 is formed on an end of the second conduit 116. The end of the second conduit 116 may be slid into the second aperture 112, for example, in the form of the slot as shown in FIGS. 1 and 2.

The annular pilot 126, 128 includes an axially extending lip 130, 132 formed at a first end thereof. The lip 130, 132 surrounds an annular surface 134, 136. An annular channel 138, 140 is formed in the annular surface 134, 136. It is understood that a protuberance (not shown) can be formed on the annular surface 134, 136 in place of or in addition to the channel 138, 140. In the embodiment shown in FIGS. 1-5 and 7, the channel 138, 140 is substantially V-shaped in cross-section. However, it is understood that channels 138, 140 having other shapes can be used, as desired.

A sealing bead 142, 144 is formed on the annular surface 134, 136 of the male block portion 106 radially inward of the channel 138, 140. Although the sealing bead 142, 144 shown has a V-shaped cross-section, other shapes can be used such as a curved radius, a rectangular, or trapezoidal shape, for example. Only one sealing bead 142, 144 is shown for use with each of the sealing structures 102, 104 in FIGS. 1 to 10; however, a plurality of sealing beads 142, 144 can be used if desired, resulting in concentric rings.

The female block portion 108 of the block fitting 100 also includes a first aperture 146 and a second aperture 148. The first aperture 146 and the second aperture 148 of the female block portion 108 are configured to be placed in fluid communication with the first conduit 114 and the second conduit 116. The first aperture 146 and the second aperture 148 of the female block portion 108 have generally circular cross-sections, and are adapted to receive additional tubes or third and fourth conduits 150, 152, respectively. The first aperture 110 and the second aperture 112 of the male block portion 106 may be concentrically aligned with the first aperture 146 and the second aperture 148 of the female block portion. The third and fourth conduits 150, 152 are joined to the female block portion 108 by any conventional method such as by brazing or welding, for example.

As with the male block portion 106, the female block portion 108 includes a third aperture 154 formed therein adapted to receive the fastener 120. The third aperture 118 of the male block portion 106 may be concentrically aligned with the third aperture 154 of the female block portion 108. The third aperture 118 of the male block portion 106, the fastener 120, and the third aperture 154 of the female block portion 108 together cooperate, in operation, to secure the male block portion 106 to the female block portion 108.

A first annular collar 155 and a second annular collar 157 are formed in the female block portion 108 and surround the first aperture 146 and the second aperture 148, respectively. Annular surfaces 159, 161 are formed between the first and second annular collars 155, 157 and the first and second apertures 146, 148. As with the male block portion 106, the annular surfaces 159, 161 may each have an annular channel 163, 165 formed therein. It is understood that a protuberance (not shown) can be formed on each of the annular surfaces 159, 161 in place of the channel 163, 165 or in addition to the channel 163, 165. It is also understood that channels 163, 165 having cross-sectional shapes other than that shown can be used. A sealing bead 167, 169 is also formed on the annular surface 159, 161 radially inward of each of the channels 163, 165. The sealing bead 167, 169 may have any cross-sectional shape other than that shown, as desired. A plurality of sealing beads 167, 169 can also be used if desired, resulting in concentric rings.

In FIGS. 1 to 8, the male bock portion 106 of the present disclosure is shown having a stabilizing heel 156. The stabilizing heel 156 is configured to militate against a placement of transverse dynamic loads on the seal structures 102, 104 due to engine vibration, for example, as shown by the horizontal arrows in FIG. 4, and likewise minimizes a resulting rocking or prying action (shown by the broken arcuate arrows in FIG. 4) on the seal structures 102, 104 in operation. In particular, the stabilizing heel 156 is configured to abut the female block portion 108 upon assembly, while a substantially fluid tight seal is also formed with the seal structures 102, 104 between the male block portion 106 and the female block portion 108.

Figure 7:
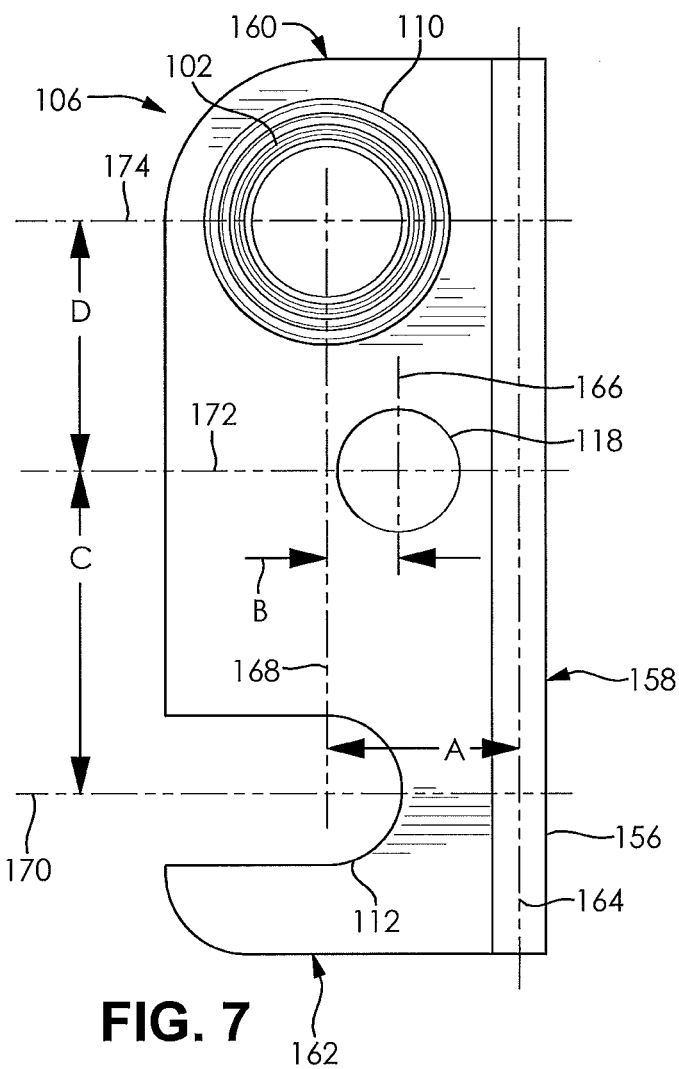
FIG. 7 is a front elevational view of the male portion of the block fitting shown in FIG. 5, illustrating with various axes the relative locations of the stabilizing heel to the other features of the male block portion.
Figure 8:
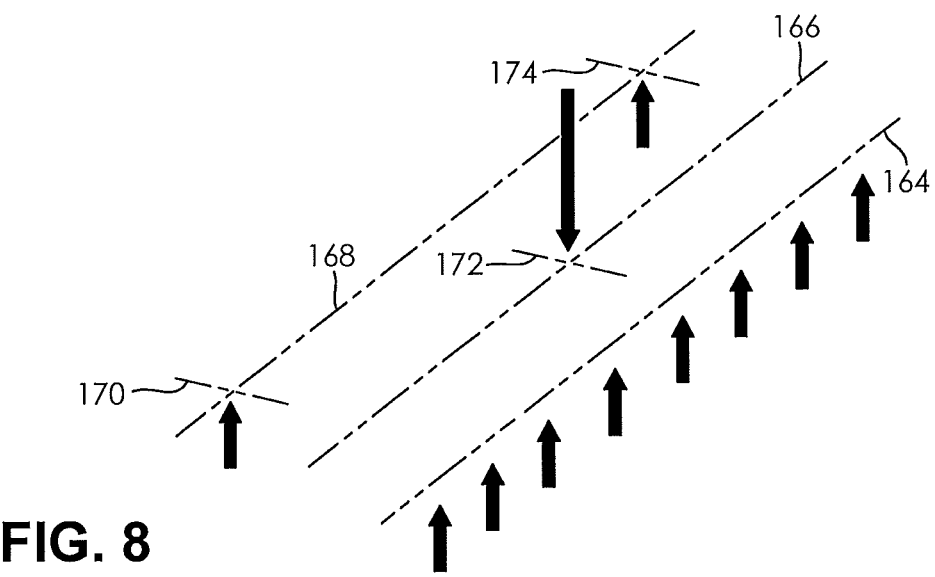
FIG. 8 is a schematic free body diagram of the forces imparted on the block fitting of FIG. 1 in operation, relative to the axes depicted in FIG. 7.
Figure 9:
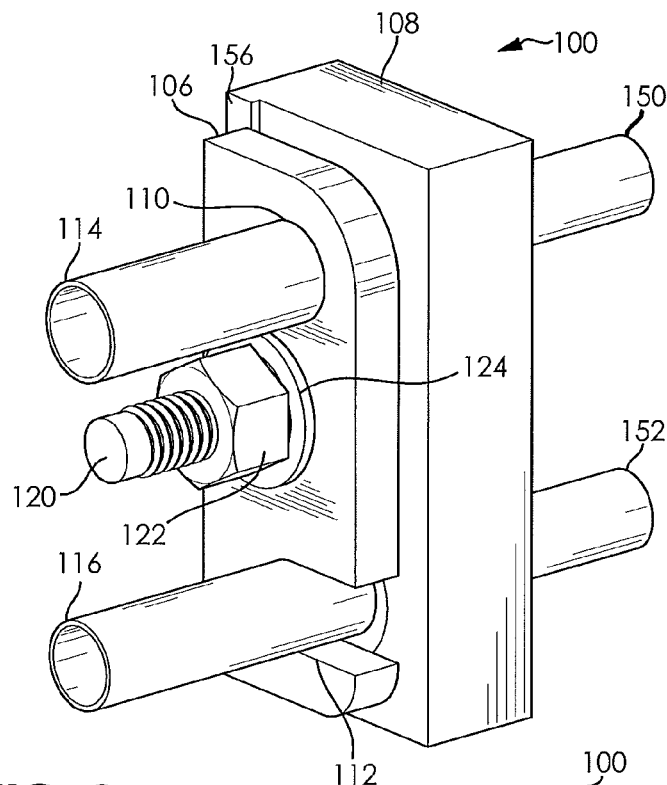
FIG. 9 is a perspective view of a block fitting for metal seal structures according to another embodiment of the present disclosure, showing a stabilizing heel formed on a female block portion of the block fitting.
Figure 10:
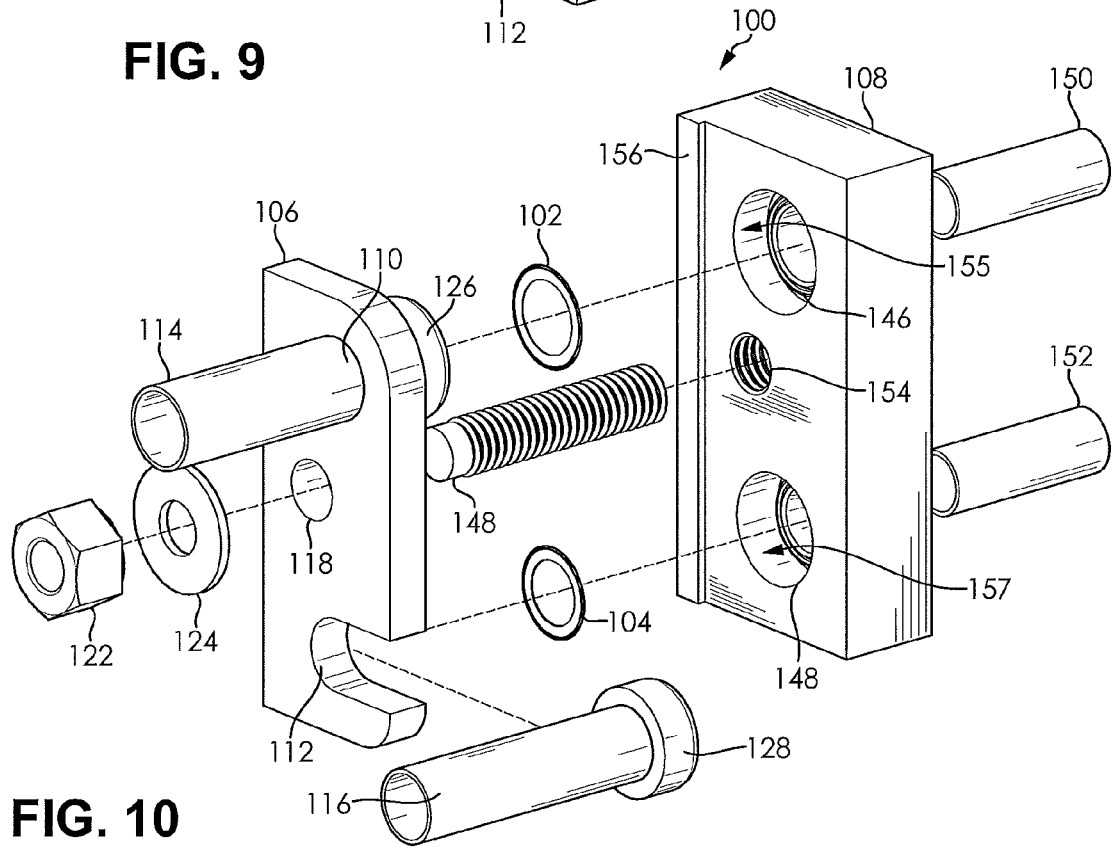
FIG. 10 is an exploded perspective view of the block fitting shown in FIG. 9.

Although the block fitting 100 is described herein primarily with respect to the stabilizing heel 156 being formed on the male block portion 106, as shown in FIGS. 1 to 8, one of ordinary skill in the art should also appreciate that the stabilizing heel 156 may alternatively be formed on the female block portion 108, for example, as shown in FIGS. 9 and 10. It should be understood that the various features of the stabilizing heel 156 described relative to the embodiments with the stabilizing heel 156 disposed on the male block portion 106 likewise apply to the embodiments with the stabilizing heel 156 disposed on the female block portion 108.

The stabilizing heel 156 of the male block portion 106 is formed adjacent a side surface 158 of the male block portion 106. The stabilizing heel 156 is spaced apart from each of the first aperture 110 and the second aperture 112. The stabilizing heel 156 has a width and a shape suitable to militate against the stabilizing heel 156 being crushed, and to otherwise withstand clamping forces associated with a securing of the male block portion 106 with the female block portion 108 in operation, without significant deformation of the stabilizing heel 156.

Figure 5:
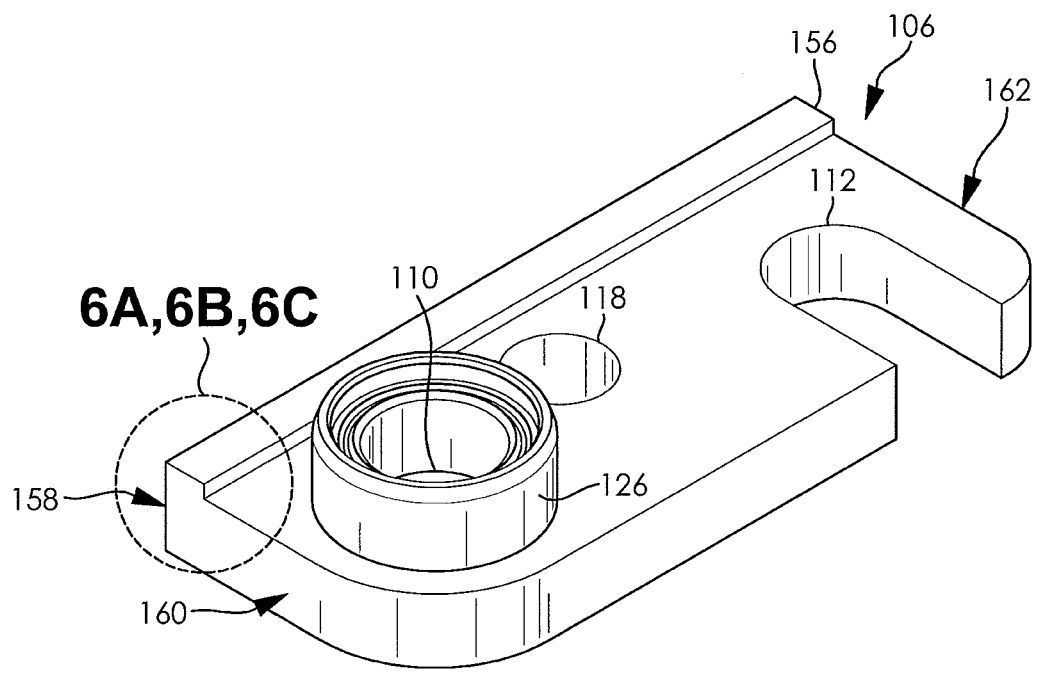
FIG. 5 is a perspective view of the male block portion of the block fitting shown in FIG. 1.

In a particular embodiment, shown in FIG. 5, the stabilizing heel 156 is a continuous raised rib or strip on the male block portion 106 that extends from an upper edge 160 of the male block portion 106 to a lower edge 162 of the male block portion 106. For example, the stabilizing heel 156 may be disposed along an entirety of the side surface 158 of the male block portion 106. The stabilizing heel 156 may be disposed flush with the side surface 158, or may be spaced apart from the side surface 158, as desired. In other embodiments, not shown, the stabilizing heel 156 may be formed from a plurality of spaced apart and raised segments.

Figure 6A:
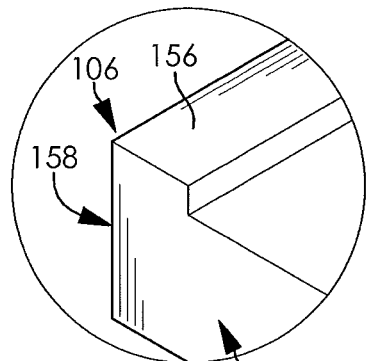
FIGS. 6A to 6C are enlarged fragmentary perspective views of the male block portion shown in FIG. 5, illustrating various embodiments of a stabilizing heel according the present disclosure.
Figure 6B:
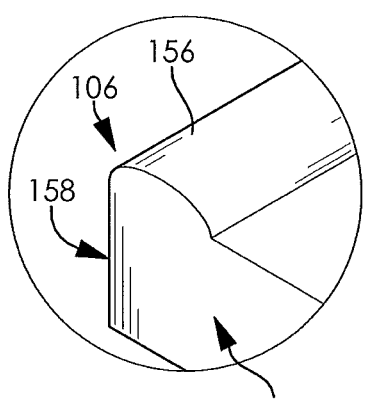
Figure 6C:
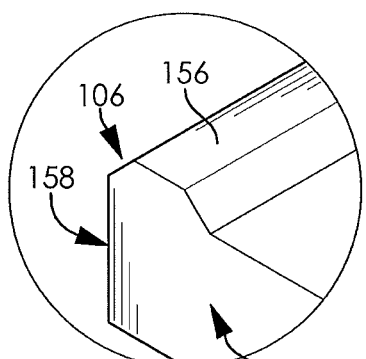

As nonlimiting examples, the stabilizing heel 156 may have one of a rectangular cross section (shown in FIG. 6A), a hemispherical cross section (shown in FIG. 6B), and a trapezoidal cross section (shown in FIG. 6C). One of ordinary skill in the art may select other suitable shapes and configurations for the stabilizing heel 156 consistent with the present disclosure, as desired.

In particular, a height of the stabilizing heel 156 is selected such that the stabilizing heel 156 abuts the female block portion 108, under a clamping force that is sufficient to create the substantially fluid tight seal with the seal structures 102, 104 between the male block portion 106 and the female block portion 108. The height of the stabilizing heel 156 may also be limited in order to prevent an impinging of the axially extending lips 130, 132 of the male block portion 106 with the annular surface 159, 161 of the female block portion 108, and more particularly an impinging of the sealing beads 142, 144 of the male block portion 106 with the sealing beads 167, 169 of the female block portion 108, in the absence of the seal structures 102, 104. In a particular example, the height of the stabilizing heel 156 may be between about 1 percent and 10 percent an average thickness of the male block portion, more particularly between about 2.5 percent and 7.5 the average thickness of the male block portion, and most particularly about 5 percent the average thickness of the male block portion. A skilled artisan may select the height for the stabilizing heel 156, suitable for a particular application of the block fitting 100, as desired.

It should be understood that the positioning of the stabilizing heel 156 relative to the first aperture 110, the second aperture 112, and the third aperture 118 can be selected to provide a sufficient level of stabilization of the male and female block portions 106, 108 relative to each other, particularly under conditions of high vibration. For example, the location of the seal structures 102, 104 in the block fitting 100 of the disclosure can be tuned so that the seal stress on each of the seal structures 102, 104 is optimized regardless of the size of the seal structures 102, 104. In particular, the farther from the fastener 120 disposed through the third aperture 118, the lower the load on the seal structures 102, 104 in operation. Likewise, the closer to the fastener 120, the higher the load on the seal structures 102, 104.

Where the seal structures 102, 104 are substantially the same size, a preferred configuration is to equally distance the seal structures 102, 104 from the fastener 120, for example, as shown in FIG. 7. Where the seal structures 102, 104 are two different sizes, then the larger of the seal structures 102, 104 may be located closer to the fastener 120.

It should be appreciated that the stabilizing heel 156 may be selectively positioned in order to alter a clamp load leverage applied to each of the seal structures 102, 104. For example, the closer the stabilizing heel 156 is to the seal structures 102, 104, the higher the clamp load on the stabilizing heel 156 and the lower the clamp load on the seal structures 102, 104. This may be particularly beneficial for smaller seal structures 102, 104, so that they are not overstressed. Likewise, the farther the stabilizing heel 156 is from the seal structures 102, 104, the lower the clamp load on the stabilizing heel 156 and the greater the clamp load on the seal structures 102, 104.

With further reference to FIGS. 7 to 8, a system for tuning the block fitting 100 is shown. The system involves an identification of a first horizontal center line 164 for the stabilizing heel 156, a second horizontal center line 166 for the fastener 120, and a third horizontal center line 168 for a center of at least one of the seal structures 102, 104. A first horizontal distance A is defined by a relative displacement of the first horizontal center line 164 and the third horizontal center line 168. A second horizontal distance B is defined by a relative displacement of the second horizontal center line 166 and the third horizontal center line 168. It should be appreciated that the clamp load from the fastener 120 applies a force to, and is subsequently reacted to by, both of the seal structures 102, 104 and the stabilizing heel 156, for example, as depicted by the arrowed lines in FIG. 8. The clamp load may be tuned or optimized by adjusting the relative dimensions of the first horizontal distance A and the second horizontal distance B.

Furthermore, the system for tuning the block fitting 100 may include an identification of a first vertical center line 170 for the second aperture 112, a second vertical center line 172 for the third aperture 118, and a third vertical center line 174 for the first aperture 110. A first vertical distance C is defined by a displacement of the first vertical center line 170 and the second vertical center line 172. A second vertical distance D is defined by a displacement of the second vertical center line 172 and the third vertical center line 174. As with the tuning of the clamp load from the fastener 120 by adjusting the relative dimensions of the first horizontal distance A and the second horizontal distance B, the clamp load may also be tuned and optimized by adjusting the relative dimensions of the first vertical distance C and the second vertical distance D. It should be appreciated that one of ordinary skill in the art may select suitable horizontal and vertical distances A, B, C, D, in order to tune the clamp load for a particular application of the block fitting 100, as desired.

To assemble the block fitting 100, as shown in FIGS. 1-8, the first conduit 114 is inserted in the first aperture 110 of the male block portion 106 and secured. The second conduit 116 having the annular pilot 128 is inserted in the second aperture 112 of the male block portion 108. The seal structures 102, 104 are then disposed within the annular lips 130, 132 of the annular pilots 126, 128, in preparation for the assembly.

The male block portion 106 and the female block portion 108 are then moved adjacent one another. The annular pilots 126, 128 of the male block portion 106 are caused to cooperate with the annular collars 155, 157 of the female block portion, with the seal structures 102, 104 disposed therebetween. The fastener 120 is inserted through the third apertures 118, 134 and tightened to sealingly engage the male block portion 106 and the female block portion 108. The seal structures 102, 104 deform as disclosed in Assignee's U.S. Pat. Nos. 7,621,568; 8,104,773; and 8,523,244 to form both a primary seal and a secondary seal.

Once assembled, the male block portion 106 and the female block portion 108 cooperate with the seal structures 102, 104 to form a fluid tight seal, and militate against leakage of a fluid (liquid or gas) from the block fitting 100. Advantageously, the placement of the stabilizing heel 156 on one of the male bock portion 106 and the female block portion 108 militates against transverse dynamic loads and the resulting loss of clamp load and seal joint degradation with prolonged use of the block fitting 100. The block fitting 100 of the present disclosure has been further found to facilitate a use of the metal seal structures in applications where the metal seal structures may otherwise be subject to severe vibration, for example, in engine mounted applications.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A block fitting for an air conditioning system comprising:
    a male block portion having a first annular pilot surrounding a first aperture of the male block portion, the first annular pilot including an axially extending lip formed at an end thereof, wherein the male block portion has an upper edge and a lower edge connected by a side surface, the first aperture of the male block portion disposed adjacent the upper edge of the male block portion;
    a female block portion having a first annular collar surrounding a first aperture of the female block portion and receiving the first annular pilot of the male block portion, the first aperture of the male block portion and the first aperture of the female block portion substantially concentrically aligned, wherein the female block portion has an upper edge and a lower edge that are connected by a side surface, the first aperture of the female block portion is disposed adjacent the upper edge of the female block portion;
    a first seal structure disposed between the first annular pilot of the male block portion and the first annular collar of the female block portion; and
    a fastener engaging the male block portion with the female block portion to form a substantially fluid tight seal with the first seal structure, the first aperture of the male block portion disposed intermediate the upper edge of the male block portion and the fastener, and the first aperture of the female block portion disposed intermediate the upper edge of the female block portion and the fastener;
    wherein one of the of the male block portion and the female block portion has a stabilizing heel formed adjacent and along the side surface thereof, wherein the stabilizing heel is disposed along an entirety of the side surface from the upper edge to the lower edge of the male block portion, the stabilizing heel militating against transverse dynamic loading of the seal structure in operation.

2. The block fitting of claim 1, wherein the stabilizing heel is disposed substantially flush with the side surface of the male block portion.

3. The block fitting of claim 1, wherein the stabilizing heel has one of a rectangular cross section, a hemispherical cross section, and a trapezoidal cross section.

4. The block fitting of claim 3, wherein the stabilizing heel has one of a hemispherical cross section and a trapezoidal cross section.

5. The block fitting of claim 1, wherein the stabilizing heel is configured to abut one of the male block portion and the female block portion when the seal with the first seal structure is formed between the male block portion and the female block portion.

6. The block fitting of claim 5, wherein a height of the stabilizing heel is between about 1 percent and 10 percent an average thickness of the male block portion.

7. The block fitting of claim 6, wherein the height of the stabilizing heel is between about 2.5 percent and about 7.5 percent the average thickness of the male block portion.

8. The block fitting of claim 7, wherein the height of the stabilizing heel is about 5 percent the average thickness of the male block portion.

9. The block fitting of claim 1, wherein the male block portion has a second annular pilot surrounding a second aperture of the male block portion, the second annular pilot including an axially extending lip formed at a first end thereof, and the female block portion has a second annular collar surrounding a second aperture of the female block portion and receiving the second annular pilot of the male block portion, and the second aperture of the male block portion and the second aperture of the female block portion are substantially concentrically aligned.

10. The block fitting of claim 9, wherein at least one of the first annular pilot and the second annular pilot is connected with a conduit that is disposed through one of the first aperture of the male block portion and the second aperture of the male block portion.

11. The block fitting of claim 9, wherein the stabilizing heel is disposed between a side surface of the male block portion and each of the first aperture and the second aperture of the male block portion.

12. The block fitting of claim 9, where each of the male block portion and the female block portion has a third aperture that receives the fastener.

13. The block fitting of claim 12, wherein the third aperture of the male block portion is disposed between the first aperture and the second aperture of the male block portion, and the stabilizing heel is disposed between a side surface of the male block portion and each of the first aperture, the second aperture, and the third aperture of the male block portion.

14. The block fitting of claim 13, wherein a first horizontal distance is defined by a displacement from a horizontal center line of the stabilizing heel to a horizontal center line of at least one of the first aperture and the second aperture, a second horizontal distance is defined by a displacement from a horizontal center line of the third aperture to the horizontal center line of at least one of the first aperture and the second aperture, and the first horizontal distance and the second horizontal distance are configured to provide an optimum clamp load on the first seal structure and the second seal structure.

15. The block fitting of claim 13, wherein a first vertical distance is defined by a displacement of a first vertical center line of the second aperture of the male block portion to a second vertical center line of the third aperture of the male block portion, a second vertical distance is defined by a displacement of the second vertical center line of the second aperture of the male block portion and a third vertical center line of the first aperture of the male block portion, and the first vertical distance and the second vertical distance are configured to provide an optimum clamp load on the first seal structure and the second seal structure.

16. The block fitting of claim 1, wherein the stabilizing heel has a width sufficient to militate against a crushing of the stabilizing heel between the male block portion and the female bock portion under forces sufficient to form the substantially fluid tight seal with the first seal structure.

17. A block fitting for an air conditioning system comprising:
a male block portion having a first annular pilot surrounding a first aperture of the male block portion, the first annular pilot including an axially extending lip formed at an end thereof, the male block portion having a stabilizing heel formed adjacent and along a side surface thereof, the stabilizing heel configured to abut a female block portion having a first annular collar surrounding a first aperture of the female block portion, wherein the male block portion has an upper edge and a lower edge that are connected by the side surface, the first aperture of the male block portion disposed adjacent the upper edge of the male block portion;
a first seal structure disposed radially inward from the axially extending lip of the male block portion; and
a fastener to engage the male block portion with the female block portion and form a substantially fluid tight seal with the first seal structure,
wherein the stabilizing heel militates against transverse dynamic loading of the first seal structure in operation, wherein the first aperture of the male block portion is disposed intermediate the upper edge and the fastener, and wherein the stabilizing heel is disposed between the side surface of the male block portion and each of the first aperture and the fastener.

18. The block fitting of claim 17, wherein the male block portion has a second annular pilot surrounding a second aperture of the male block portion, the second annular pilot including an axially extending lip formed at a first end thereof, and the female block portion has a second annular collar surrounding a second aperture of the female block portion and receiving the second annular pilot of the male block portion, and the second aperture of the male block portion and the second aperture of the female block portion are substantially concentrically aligned.

19. A block fitting for an air conditioning system comprising:
a female block portion having a first annular collar surrounding a first aperture of the female block portion, the female block portion having a stabilizing heel formed adjacent and along a side surface thereof, the stabilizing heel configured to abut a male block portion having a first annular pilot surrounding a first aperture of the male block portion, the first annular pilot including an axially extending lip formed at an end thereof, wherein the female block portion has a second annular collar surrounding a second aperture of the female block portion and the male block portion has a second annular pilot surrounding a second aperture of the male block portion, the second aperture of the female block portion receiving the second annular pilot of the male block portion, the second annular pilot including an axially extending lip formed at a first end thereof, and the second aperture of the male block portion and the second aperture of the female block portion are substantially concentrically aligned, and wherein the side surface extends from an upper edge adjacent the first aperture of the female block portion to a lower edge adjacent the second aperture of the female block portion;
a first seal structure disposed radially inward from the first annular collar of the female block portion; and
a fastener to engage the female block portion with the male block portion and form a substantially fluid tight seal with the first seal structure, the fastener disposed intermediate the first aperture of the female block portion and the second aperture of the female block portion, wherein the stabilizing heel is disposed between the side surface of the female block portion and each of the first aperture of the female block portion, the second aperture of the female block portion, and the fastener;
wherein the stabilizing heel militates against transverse dynamic loading of the first seal structure in operation.

* * * * *